(12) United States Patent
Greentree et al.

(10) Patent No.: US 9,863,164 B2
(45) Date of Patent: Jan. 9, 2018

(54) AWNING ARM FOR A CAMPER TRAILER

(71) Applicant: EZI CAMPER AWNING ARM PTY LTD, Currumbin (AU)

(72) Inventors: John Arthur Greentree, Caboolture (AU); Ian Patrick Fuller, Worongary (AU)

(73) Assignee: EZI CAMPER AWNING ARM PTY LTD, Currumbin (AU)

( * ) Notice: Subject to any disclaimer, the term of this patent is extended or adjusted under 35 U.S.C. 154(b) by 0 days.

(21) Appl. No.: 15/292,192

(22) Filed: Oct. 13, 2016

(65) Prior Publication Data

US 2017/0101802 A1    Apr. 13, 2017

(30) Foreign Application Priority Data

Oct. 13, 2015 (AU) ................................ 2015904166

(51) Int. Cl.
| | | |
|---|---|---|
| *B60R 15/00* | (2006.01) | |
| *E04H 15/08* | (2006.01) | |
| *B60P 3/36* | (2006.01) | |
| *E04H 15/46* | (2006.01) | |

(52) U.S. Cl.
CPC ............... *E04H 15/08* (2013.01); *B60P 3/36* (2013.01); *E04H 15/46* (2013.01)

(58) Field of Classification Search
CPC ......... A01B 35/20; A01B 43/00; A01B 49/02; B67D 9/02; E01C 11/126; B60P 3/36; B60P 3/34; B60P 3/341; B60J 7/104; B60J 7/102

USPC ........................................................ 296/156
See application file for complete search history.

(56) References Cited

U.S. PATENT DOCUMENTS

| | | | | |
|---|---|---|---|---|
| 3,789,903 A | * | 2/1974 | Clark ................... | B60P 3/343 135/140 |
| 3,918,510 A | * | 11/1975 | Hayward ............... | B60P 3/343 135/119 |
| 4,117,876 A | * | 10/1978 | Bennett ................. | B60P 3/343 135/88.12 |
| 4,801,119 A | * | 1/1989 | Pelletier ................ | B60P 3/343 135/88.12 |
| 4,862,940 A | * | 9/1989 | Atchison ............... | B60P 3/343 160/23.1 |
| 5,148,848 A | * | 9/1992 | Murray .................. | B60P 3/343 160/66 |
| 5,303,726 A | | 4/1994 | Merrill | |

(Continued)

*Primary Examiner* — Kiran B Patel
(74) *Attorney, Agent, or Firm* — Mark David Torche; Patwrite Law

(57) ABSTRACT

An awning support arm for a camper trailer including: an outer member formed with an elongated opening; an intermediate member slidable relative to the outer member; an inner member slidable relative to the intermediate member; an outer fastening assembly arranged to hold the outer member fast with the intermediate member; and an inner fastening assembly arranged to hold the intermediate member fast with the inner member the inner fastening assembly including a user operation portion that extends through the elongated opening of the outer member; wherein the members may be slid relative to each other to assume an extended configuration or a retracted configuration and maintained in either configuration by means of said fastening assemblies.

10 Claims, 5 Drawing Sheets

(56) References Cited

U.S. PATENT DOCUMENTS

| | | | | |
|---|---|---|---|---|
| 5,560,411 A * | 10/1996 | Becker | E04F 10/0603 | 135/88.12 |
| 5,597,006 A * | 1/1997 | Simonetti | B60P 3/343 | 135/88.01 |
| 5,752,556 A * | 5/1998 | Steadman | E04F 10/005 | 135/88.1 |
| 6,029,732 A * | 2/2000 | Malott | E04F 10/0603 | 135/88.12 |
| 6,131,990 A * | 10/2000 | Crean | E04F 10/0614 | 135/88.01 |
| 6,260,909 B1 * | 7/2001 | Crean | E04F 10/0614 | 135/88.01 |
| 6,341,638 B1 * | 1/2002 | Thompson | E04F 10/0614 | 160/67 |
| 6,494,246 B1 * | 12/2002 | Blevins | E04F 10/0614 | 135/88.12 |
| 6,598,612 B1 * | 7/2003 | Crowe | E04F 10/0614 | 135/88.11 |
| 6,752,193 B1 * | 6/2004 | Molloy | B60J 5/14 | 160/310 |
| 7,328,935 B1 * | 2/2008 | Tarin | E04H 15/06 | 135/88.12 |
| 7,798,197 B2 * | 9/2010 | Gutierrez | E04F 10/0614 | 160/67 |
| 7,967,050 B2 * | 6/2011 | Gutierrez | E04F 10/0603 | 160/67 |
| 8,176,686 B2 * | 5/2012 | Santini | E04H 3/28 | 52/66 |
| 8,256,486 B1 * | 9/2012 | Thomas | E04F 10/0618 | 160/44 |
| 2002/0062851 A1 * | 5/2002 | Thompson | E04F 10/0614 | 135/88.12 |
| 2003/0094833 A1 * | 5/2003 | Thompson | E04H 15/08 | 296/163 |
| 2004/0045683 A1 * | 3/2004 | Carrillo | E04F 10/0614 | 160/310 |
| 2004/0221965 A1 * | 11/2004 | Wagner | E04F 10/0614 | 160/67 |
| 2005/0072532 A1 * | 4/2005 | Holden | E04F 10/0685 | 160/66 |
| 2005/0076664 A1 * | 4/2005 | Sylvia | B60H 1/00 | 62/304 |
| 2006/0032592 A1 * | 2/2006 | Hicks | E04F 10/0614 | 160/66 |
| 2008/0185107 A1 * | 8/2008 | Migues | E04F 10/06 | 160/66 |
| 2009/0056884 A1 * | 3/2009 | Vogt | E04F 10/02 | 160/62 |
| 2010/0312243 A1 * | 12/2010 | Ross | A61B 17/62 | 606/56 |
| 2011/0253183 A1 * | 10/2011 | Mowatt, Sr. | E04F 10/0603 | 135/88.05 |
| 2012/0153667 A1 * | 6/2012 | Raber | B60P 3/34 | 296/162 |
| 2012/0180892 A1 * | 7/2012 | Ziegler | E04F 10/0614 | 137/801 |
| 2013/0126104 A1 * | 5/2013 | Weber | E04F 10/0618 | 160/79 |
| 2013/0213587 A1 * | 8/2013 | Goodman | E04F 10/0666 | 160/65 |
| 2014/0251552 A1 * | 9/2014 | Ma | E04F 10/04 | 160/45 |
| 2016/0138291 A1 * | 5/2016 | Fiwek | E04H 15/62 | 135/116 |

* cited by examiner

AWNING ARM FOR A CAMPER TRAILER

CROSS REFERENCE TO RELATED APPLICATIONS

This application claims priority under the Paris Convention on Australia Patent Application No. 2015904166 filed on Oct. 13, 2015, the entire content of which is herein incorporated by reference

TECHNICAL FIELD

The present invention relates to recreational vehicles such as caravans and to awnings for recreational vehicles. Particular applications of the invention include awning assemblies for camper trailers typically of the wind up type.

BACKGROUND OF THE INVENTION

It is known to provide a canopy or rollout awning for a recreational vehicle such as a caravan. The awning may be supported at its outer edges by arms that are pivotally mounted to the side of the recreational vehicle and which can be pivoted out to support the outer edges of the awning. When the recreational vehicle is parked the awning can be extended laterally from a side of the recreational vehicle to provide shade and an undercover outside area adjacent the recreational vehicle. Whilst the recreational vehicle is travelling the awning is retracted and the arms are brought against the side of the recreational vehicle.

A problem that arises with canopy support arms is that they are presently not well suited for use with camper trailers. Camper trailers, or as they are sometimes called, expandable caravans have a lower rigid base and wall section and an upper, flexible wall and roof section. During towing of a camper trailer the upper section is collapsed down upon the lower base section. In the collapsed configuration towing of the camper trailer is straightforward due to its low profile. Once the camper trailer is parked the top section is erected so that there is sufficient headroom within the camper trailer for occupants.

To date it has not been convenient to affix a rollout awning to a side of a camper trailer because arms have not been known which are suitable for locating vertically to the side of the camper trailer in the collapsed configuration and which are able to support an outer edge of the awning once the camper trailer is in the erected configuration.

It is an object of the present invention to provide an arm that is suitable for supporting the rollout awning of a camper trailer.

SUMMARY OF THE INVENTION

According to a first aspect of the present invention there is provided an awning support arm for a camper trailer including:

an outer member formed with an elongated opening;

an intermediate member slidable relative to the outer member;

an inner member slidable relative to the intermediate member;

an outer fastening assembly arranged to hold the outer member fast with the intermediate member; and an inner fastening assembly arranged to hold the intermediate member fast with the inner member the inner fastening assembly including a user operation portion that extends through the elongated opening of the outer member; wherein the members may be slid relative to each other to assume an extended configuration or a retracted configuration and maintained in either configuration by means of said fastening assemblies.

In a preferred embodiment of the present invention the outer fastening assembly is mounted to the outer member and includes a pin that penetrates a first hole formed through the intermediate member to fasten the intermediate member in an extended configuration relative to the outer member.

It is preferred that a second hole be formed through the intermediate member at a distance from the first hole whereby the pin of the outer fastening assembly penetrates the second hole in the retracted configuration.

In a preferred embodiment of the invention the outer fastening assembly includes a spring loaded plunger which is biased to urge the pin toward the intermediate member.

Preferably the inner fastening assembly includes at least one threaded member to which a user operation handle is attached wherein the threaded member engages a clamping member disposed within the inner member, whereby tightening of the threaded member urges opposed surfaces of the inner member and the intermediate member into abutment to thereby fix the inner member in a desired position relative to the outer member.

The inner fastening assembly may include two threaded members disposed toward opposite ends of the clamping member and threadedly engaged therewith.

In a preferred embodiment of the invention each of the inner member, the outer member and the intermediate member is formed with elongate openings to accommodate sliding motion of members protruding from adjacent of said arms.

According to a further aspect of the present invention there is provided a camper trailer awning assembly including:

a pair of support arms pivotally attached at lower ends thereof to a side of the camper trailer, each of the support arms being of the previously described type;

a member for supporting an edge of an awning disposed between upper ends of the support arms; and a pair of awning support struts extending from above the lower ends of the support arms and arranged to brace each of the support arms in their extended configuration.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF THE INVENTION

Figure 1A:
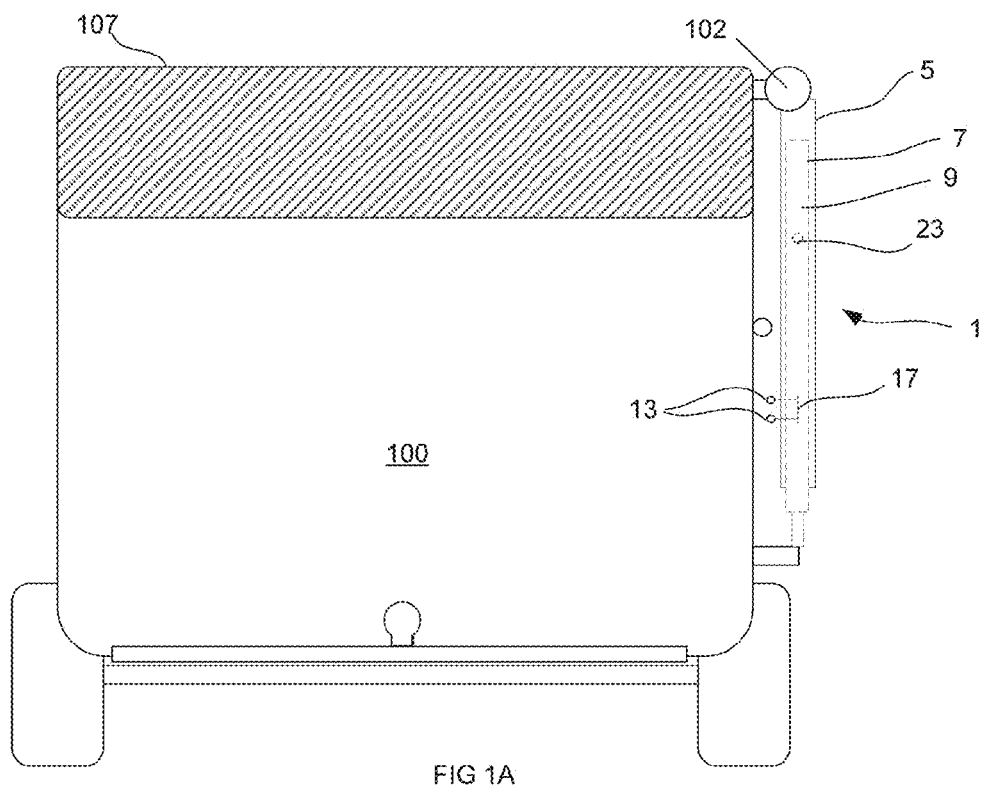
FIG. 1A is a front view of a camper trailer with the arms and the roof of the camper trailer retracted.
Figure 1B:
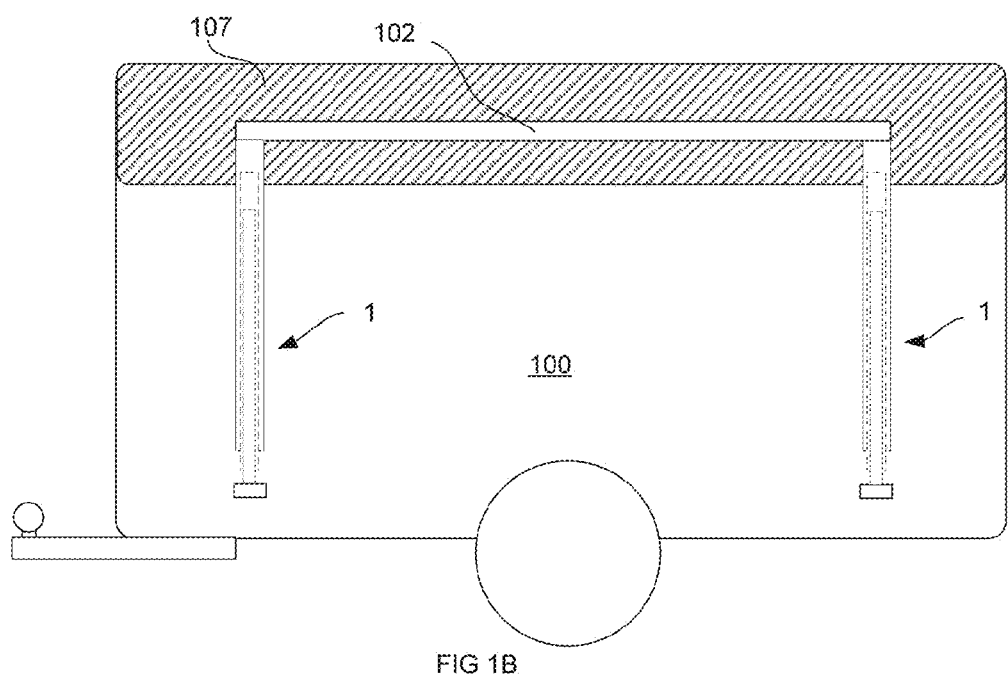
FIG. 1B is a side view of a camper trailer with the arms and the roof of the camper trailer retracted.

Referring now to FIGS. 1A and 1B, there is shown a camper trailer or "expandable" caravan 100 in front and side view respectively.

As shown in FIGS. 1A and 1B the camper trailer 100 is in a retracted configuration wherein its pop-top roof 107 is pulled down for storage or travel. Telescopic awning support arms 1, each according to a preferred embodiment of the present invention, are mounted to the side of the camper trailer 100 toward its forward and rear ends.

Figure 1C:
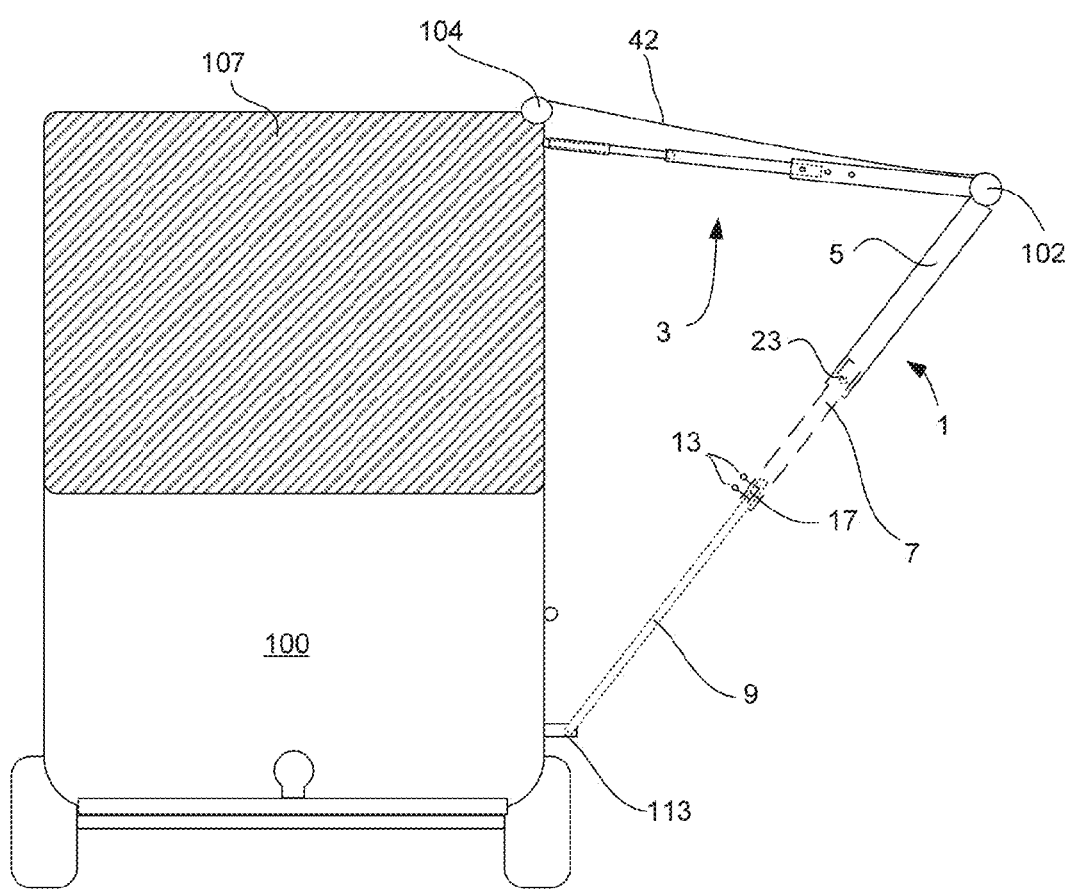
FIG. 1C is a front view of a camper trailer with the roof expanded and the arms in an extended configuration supporting an outer edge of the awning.

An awning roller tube 102 is attached between upper ends of the left and right arms 1 for supporting an outer edge of awning canopy 42 (shown in FIG. 1C).

FIG. 1C is a front view of the camper trailer 100 in use with the pop-top roof 107 extended upwardly. In this configuration the left and right arms 1 are extended, in a manner that will be explained, with their upper ends supporting an outer edge of awning canopy 42. The awning canopy 42 extends from an awning track 104 to the awning roller tube 102 and tilts downwardly to allow water to runoff and away from the side of the caravan 100. Left and right tension struts 3 attach proximally towards an upper edge of the camper trailer pop-top roof and distally to the remote ends of the left and right arms 1. The triangulation of the caravan side wall, tension struts 3 and arms 1 provides support to the awning canopy 42 in the extended configuration shown in FIG. 1C.

The arms 1 may also be unhinged from the lower support bracket 113 fastened to the chassis or lower portion of the camper trailer to stand the arms 1 on the ground in an upright vertical position if desired.

It may be observed from FIG. 1C that the arm 1 includes three members, an outer member 5, to the free end of which the awning roller tube 102 is attached, an intermediate member 7 which slides within the outer member 5 and an inner member 9, which slides within the intermediate member 7. The lower end of the inner member 9 is pivotally attached to the side of the caravan via bracket 113.

Figure 2A:
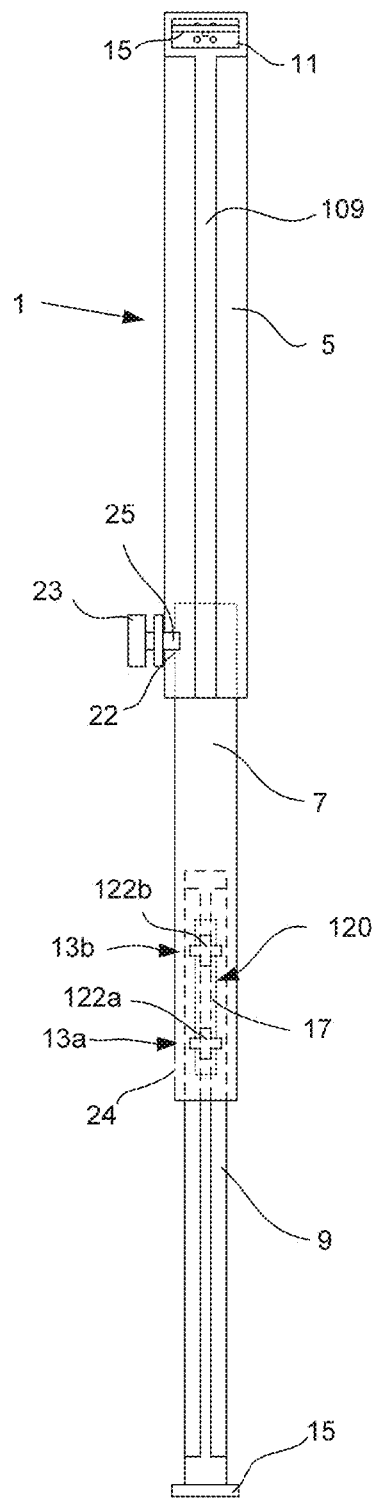
FIG. 2A is a plan view of an arm in an extended configuration.
Figure 4:
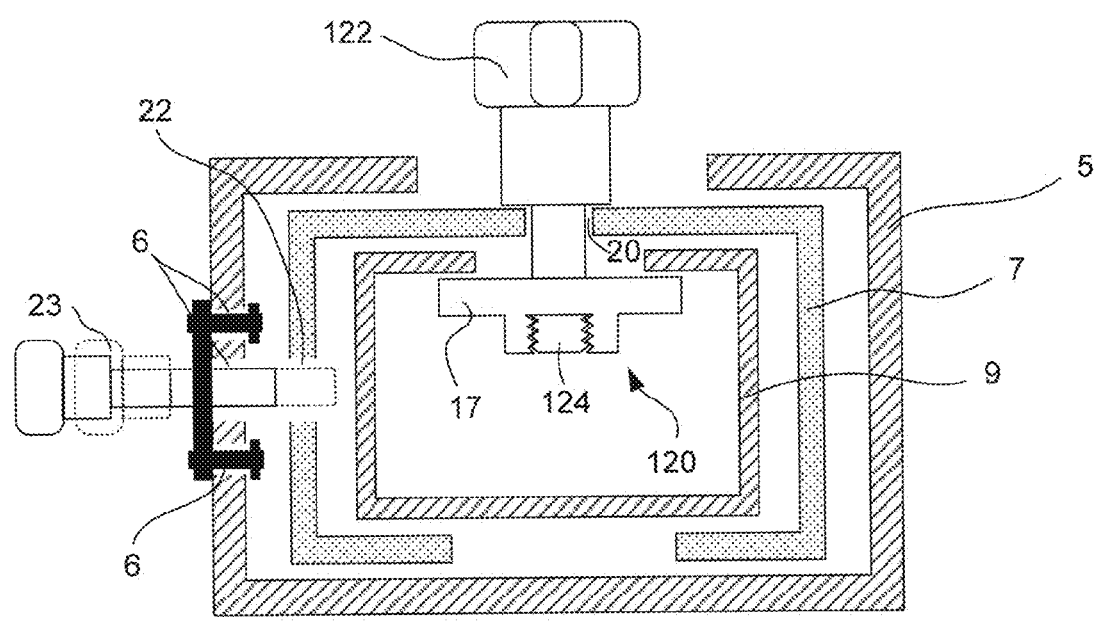
FIG. 4 is a partially cutaway and cross sectional view of the arm.

Referring to FIGS. 2A and 4 the three members are each provided in the form of a U shaped channel with medially directed returns defining an elongated opening or slot therebetween, e.g. opening 109 of the outer member 5 as shown in FIG. 2A.

Figure 2B:
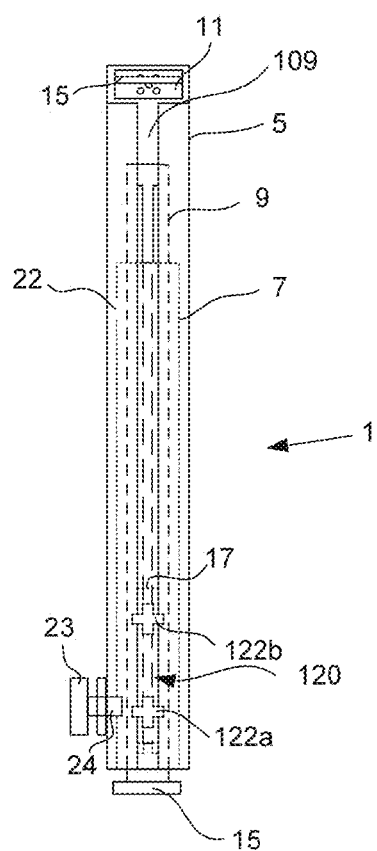
FIG. 2B is a plan view of an arm in a retracted configuration.
Figure 3:
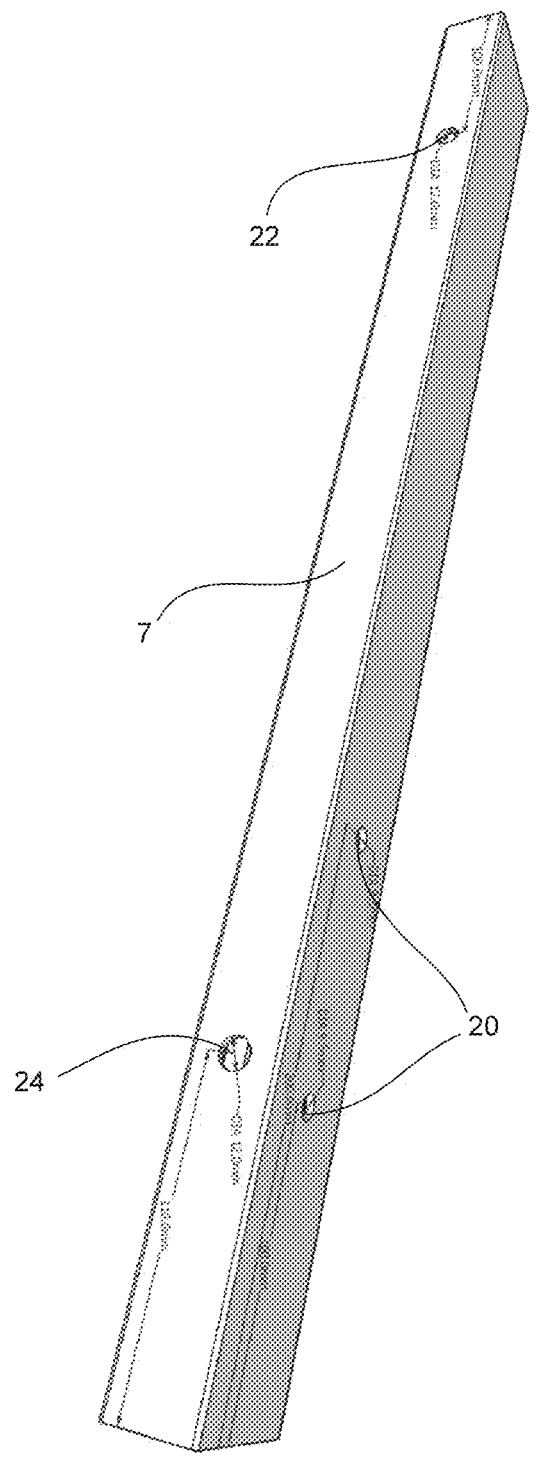
FIG. 3 depicts an intermediate member of the arm.

FIGS. 2A and 2B are plan views of arm 1 in erected and retracted configurations respectively. The outer member 5 is formed with a plunger pin opening formed through one side toward its bottom end. An outer fastening assembly 23 in the form of a spring loaded plunger is mounted to the outer member 5 so that a plunger pin 25 of the plunger locates coaxially with the plunger pin opening. In the extended configuration shown in FIG. 2A the plunger pin 25 penetrates through the plunger pin opening in the side of the outer member 5 and thence through a hole 22 that is formed through the side of intermediate member 7 toward the intermediate member's upper end. Accordingly, in the configuration shown in FIG. 2A the plunger pin 25 retains the intermediate member 7 and the outer member 5 so that they are non-sliding and extended with respect to each other. A support bracket 11 is located at the upper end of the outer member 5. The support bracket is in the form of a U channel member having triangular sides with a pin 15 therebetween. The tension strut 3 connects to the arm 1 by means of pin 15 to thereby provide support for the awning in the extended configuration as shown in FIG. 1C.

The tension strut 3 may typically consist of a central pivot folding arm 1 with an air ram tensioning strut within a box profile member pivoting inside a U channel with a locking pin.

Referring again to FIG. 2A, an inner fastening assembly in the form of clamp or clamping assembly 120 (shown in cross section in FIG. 4) is provided to clamp the intermediate member 7 and the inner member 9 together at a desired position relative to each other. The clamp 120 includes of two fasteners 13a, 13b, (generally referred to as "13"). Each fastener 13 has an operator handle 122 that is concentrically mounted to a threaded shaft 124. The shaft proceeds through openings 20 in the intermediate member 7 and threadedly attaches to clamp plate 17. Clamp plate 17 is located inside the inner member 9 so that rotating the operator handle 122 in turn rotates the threaded shaft 124 thereby bringing the clamping plate 17 toward the inner member 9 and causing it to be clamped against the intermediate member 7. Consequently the inner member and the outer member may be clamped together at a desired position.

Referring now to FIG. 2B, the arm 1 is shown in a collapsed or retracted configuration. To bring the arm 1 from the extended configuration of FIG. 2A to the retracted configuration of FIG. 2B a user firstly withdraws the handle of plunger assembly 23 in order that the plunger pin 25 is brought clear from the hole 22 of the intermediate member 7. Once that is done the outer member 5 is free to slide and is then slid downwards until the plunger pin 25 registers with a second hole 24 that is formed through the side of intermediate member 7 towards its lower end. As the plunger pin 25 registers with the second hole it penetrates therethrough and so locks the outer member 5 in a retracted configuration relative to the intermediate member 7. The handles 122a and 122b of the clamping assembly 120 are then rotated to loosen the clamping plate 17 and so remove the clamping force holding the intermediate member 7 fast with the inner member 9. The intermediate member, along with the outer member that is locked to it, is then slid down the inner member 9 to the retracted position shown in FIG. 2B. In the retracted position the clamp handles 122a and 122b are tightened to clamp the intermediate member 7 to the inner member 9.

It will therefore be realized that the arm 1 constitutes an effective and convenient awning arm for a rollout awning fitted to a camper trailer. The arm can be quickly extended in an initial operation by means of the outer fastening assembly, e.g. plunger 23, wherein the outer member is extended from the retracted configuration (relative to intermediate member 7) that is defined by second hole 24, to the extended configuration that is defined by hole 22. A fine extension adjustment can then be made by use of the inner fastening assembly, e.g. clamp 120, which allows for the intermediate member and the inner member to be clamped together at a desired position relative to each other. Consequently, the arm is convenient to use and may be readily extended for supporting the awning as shown in FIG. 1C and also readily retracted when it is time to move the camper trailer as shown in FIGS. 1A and 1B.

Furthermore, by virtue of the arm composed of three sliding members it has, in its extended configuration, an overall length that is sufficient to support the outer edge of the awning whilst the camper trailer is at its full height. Nevertheless, in its retracted configuration the arm is able to assume a reduced length that falls within the height of the side of the camper trailer when the caravan is retracted as shown in FIGS. 1A and 1B. Consequently, the arm is highly suitable for use with camper trailers.

In compliance with the statute, the invention has been described in language more or less specific to structural or methodical features. The term "comprises" and its variations, such as "comprising" and; "includes" and its variations, are used throughout in an inclusive sense and not to the exclusion of any additional features. It is to be understood that the invention is not limited to specific features shown or described since the means herein described includes preferred forms of putting the invention into effect. The invention is, therefore, claimed in any of its forms or modifications within the proper scope of the appended claims appropriately interpreted by those skilled in the art.

What is claimed is:

1. An awning support arm for a camper trailer comprising:
   an outer member formed with an elongated opening;
   an intermediate member slidable relative to the outer member;
   an inner member slidable relative to the intermediate member;
   an outer fastening assembly arranged to hold the outer member fast with the intermediate member; and
   an inner fastening assembly arranged to hold the intermediate member fast with the inner member the inner fastening assembly including a user operation portion that extends through the elongated opening of the outer member;
   wherein the members may be slid relative to each other to assume an extended configuration or a retracted configuration and maintained in either configuration by means of said fastening assemblies.

2. An arm according to claim 1, wherein the outer fastening assembly is mounted to the outer member and includes a pin that penetrates a first hole formed through the intermediate member to fasten the intermediate member in an extended configuration relative to the outer member.

3. An arm according to claim 2, wherein a second hole be formed through the intermediate member at a distance from the first hole whereby the pin of the outer fastening assembly penetrates the second hole in the retracted configuration.

4. An arm according to claim 1, wherein, in a preferred embodiment of the invention the outer fastening assembly comprises a spring loaded plunger which is biased to urge the pin toward the intermediate member.

5. An arm according to claim 2, wherein, in a preferred embodiment of the invention the outer fastening assembly comprises a spring loaded plunger which is biased to urge the pin toward the intermediate member.

6. An arm according to claim 2, wherein the inner fastening assembly comprises at least one threaded member to which the user operation portion is attached wherein the threaded member engages a clamping member disposed within the inner member, whereby tightening of the threaded member urges opposed surfaces of the inner member and the intermediate member into abutment to thereby fix the inner member in a desired position relative to the outer member.

7. An arm according to claim 6, wherein the inner fastening assembly comprises two threaded members disposed toward opposite ends of the clamping member and threadedly engaged therewith.

8. An arm according to claim 7, wherein each of the inner member, the outer member and the intermediate member are formed with elongate openings to accommodate sliding motion protrusions from adjacent of said arms.

9. A camper trailer awning assembly including:
   a pair of support arms pivotally attached at lower ends thereof to a side of the camper trailer, each of the support arms being according to claim 1;
   a member for supporting an edge of an awning disposed between upper ends of the support arms; and
   a pair of awning support struts extending from above the lower ends of the support arms and arranged to brace each of the support arms in their extended configuration.

10. A camper trailer awning assembly including:
    a pair of support arms pivotally attached at lower ends thereof to a side of the camper trailer, each of the support arms being according to claim 3;
    a member for supporting an edge of an awning disposed between upper ends of the support arms; and
    a pair of awning support struts extending from above the lower ends of the support arms and arranged to brace each of the support arms in their extended configuration.

* * * * *